(12) United States Patent
O'Hare et al.

(10) Patent No.: US 11,204,808 B2
(45) Date of Patent: Dec. 21, 2021

(54) OFFLOAD COMPUTING PROTOCOL

(71) Applicant: Intel Corporation, Santa Clara, CA (US)

(72) Inventors: Fearghal O'Hare, Leixlip (IE); Michael Nolan, Celbridge (IE); James A. O'Neill, Meath (IE)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 15/375,940

(22) Filed: Dec. 12, 2016

(65) Prior Publication Data

US 2018/0165131 A1    Jun. 14, 2018

(51) Int. Cl.
| | |
|---|---|
| *G06F 9/50* | (2006.01) |
| *H04L 29/08* | (2006.01) |
| *G06F 9/455* | (2018.01) |
| *H04W 84/12* | (2009.01) |
| *H04W 4/80* | (2018.01) |
| *H04W 4/70* | (2018.01) |
| *H04L 12/26* | (2006.01) |

(Continued)

(52) U.S. Cl.
CPC .......... *G06F 9/5027* (2013.01); *H04L 67/10* (2013.01); *H04L 67/1002* (2013.01); *H04L 67/34* (2013.01); *G06F 9/45504* (2013.01); *G06F 2209/502* (2013.01); *G06F 2209/509* (2013.01); *H04L 12/1403* (2013.01); *H04L 12/1407* (2013.01); *H04L 43/08* (2013.01); *H04L 43/10* (2013.01); *H04L 63/0485* (2013.01); *H04W 4/70* (2018.02); *H04W 4/80* (2018.02); *H04W 84/12* (2013.01)

(58) Field of Classification Search
CPC . H04L 69/32; H04L 12/1403; H04L 12/1407; H04L 63/0485
See application file for complete search history.

(56) References Cited

U.S. PATENT DOCUMENTS

| | | | |
|---|---|---|---|
| 9,104,412 B2 | 8/2015 | Lynar et al. | |
| 2006/0104308 A1* | 5/2006 | Pinkerton | ........... H04L 63/0485 |
| | | | 370/469 |

(Continued)

FOREIGN PATENT DOCUMENTS

| | | |
|---|---|---|
| EP | 3552106 | 10/2019 |
| WO | 2015138504 | 9/2015 |
| WO | 2018111475 | 6/2018 |

OTHER PUBLICATIONS

International Search Report, PCT Application No. PCT/US2017/061245, dated Feb. 9, 2018, 3 pages.

(Continued)

*Primary Examiner* — Barbara B Anyan
(74) *Attorney, Agent, or Firm* — Schwegman Lundberg & Woessner, P.A.

(57) ABSTRACT

Systems and methods for are provided for offloading computing tasks from constrained devices. An example apparatus includes an offload computing protocol (OCP) enabled device. The OCP enabled device includes OCP extensions to the operating system to enable the offloading of computing tasks. A proximity locator may use a radio transceiver to locate an OCP device that can accept a computing task. The OCP enabled device may include an OCP bundle comprising code and data, wherein the OCP bundle is to be sent to the OCP device.

22 Claims, 6 Drawing Sheets

(51) Int. Cl.
*H04L 12/14* (2006.01)
*H04L 29/06* (2006.01)

(56) References Cited

U.S. PATENT DOCUMENTS

| | | | |
|---|---|---|---|
| 2008/0163183 A1* | 7/2008 | Li | G06F 8/456 717/149 |
| 2011/0231469 A1 | 9/2011 | Wolman et al. | |
| 2014/0122558 A1* | 5/2014 | Azar | G06F 9/5094 709/201 |
| 2015/0248532 A1* | 9/2015 | Rajasenan | G06Q 50/22 705/2 |
| 2015/0312808 A1* | 10/2015 | Kiss | H04L 12/1407 370/331 |
| 2016/0073247 A1* | 3/2016 | Liu | H04L 12/1403 455/406 |
| 2016/0205036 A1 | 7/2016 | Jia et al. | |
| 2016/0285780 A1* | 9/2016 | Strijkers | H04L 67/10 |
| 2016/0316314 A1 | 10/2016 | Swaminathan et al. | |
| 2017/0026885 A1* | 1/2017 | Panigrahi | H04W 36/22 |
| 2017/0181027 A1* | 6/2017 | Raleigh | H04W 36/14 |
| 2017/0317946 A1* | 11/2017 | Ji | H04L 67/1002 |
| 2017/0353397 A1* | 12/2017 | Che | H04L 67/10 |

OTHER PUBLICATIONS

Lewis et al., "Architecture Strategies for Cyber-Foraging: Preliminary Results from a Systematic Literature Review", Software Architecture: 8th European Conference, ECSA 2014, Vienna, Austria, Aug. 2014, pp. 1-16.

Shi et al., "Edge Computing: Vision and Challenges", IEEE Internet of Things Journal, vol. 3, No. 5, Oct. 2016, pp. 637-646, USA.

"European Application Serial No. 17882156.7, Extended European Search Report dated Jun. 23, 2020", 12 pgs.

"International Application Serial No. PCT US2017 061245, Written Opinion dated Feb. 9, 2018", 11 pgs.

"International Application Serial No. PCT US2017 061245, International Preliminary Report on Patentability dated Jun. 27, 2019", 13 pgs.

"European Application Serial No. 17882156.7, Response filed Oct. 16, 2020 to Extended European Search Report dated Jun. 23, 2020", 16 pgs.

* cited by examiner

OFFLOAD COMPUTING PROTOCOL

TECHNICAL FIELD

The present techniques relate generally to Internet of Things (IoT) devices. More specifically the present techniques relate to devices that can offload computing workloads to proximate devices.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to 50 billion devices by 2020. For organizations, IoT devices may provide opportunities for monitoring, tracking, or controlling other devices and items, including further IoT devices, other home and industrial devices, items in manufacturing and food production chains, and the like. The proliferation of internet-of-things (IoT) devices may provide opportunities for new business models, such as providing services to other devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
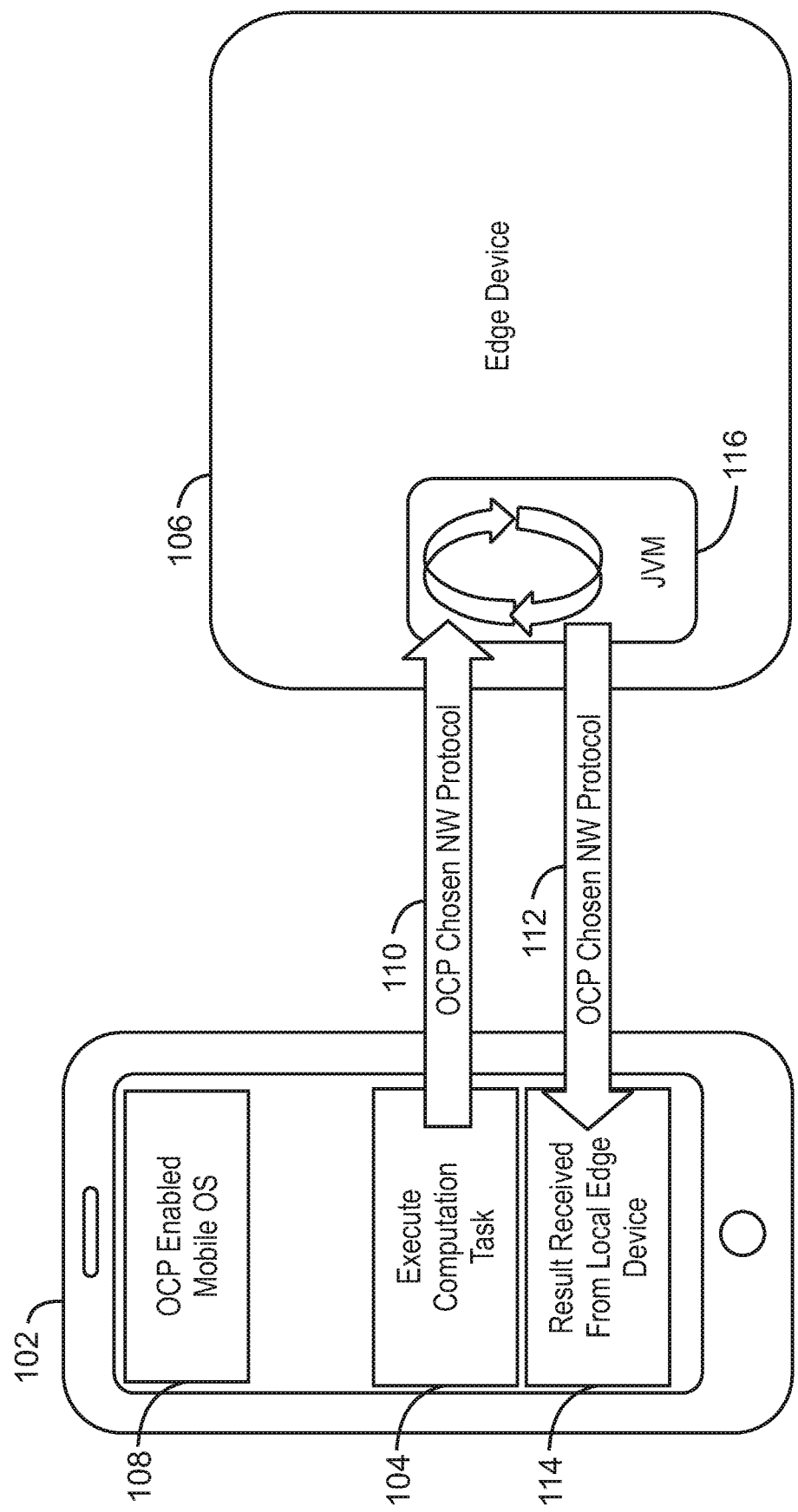
FIG. 1 is a drawing of mobile device offloading a computing task to an edge device, such as an IoT device.

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be an advertising display, a smart phone, a laptop, a tablet, or a PC, among others. Further, an IoT device may be a virtual device, such as an application on a smart phone or other computing device. IoT devices may include IoT gateways, used to couple IoT devices to other IoT devices and to cloud applications, for data storage, process control, and the like.

Devices such as wearable devices, smart phones, and tablets, among others have limited battery reserve, local storage, and network bandwidth. Compute intensive tasks in particular may not be feasible or may drain the battery rapidly.

The proliferation of internet-of-things (IoT) devices may provide opportunities for using compute power in other devices. Mobile and wearable devices may offset the constraints by utilizing less constrained proximate devices, such as IoT devices, which may have greater memory, available computing power and separate power, and network connections. Accordingly, the IoT devices may be active participants in a local IoT ecosystem.

Further, the development of low-cost processors with relatively high processing power may increase the amount of computing power available in IoT devices, and, thus, increase the feasibility of providing processing power to proximate devices. For example, processors have been developed that have two, four, or eight processor cores and use symmetrical multithreading building blocks, allowing each processor core to appear as to processor cores. This may allow a two core processor to support four simultaneous computing threads, a four core processor to support eight simultaneous computing threads, and the like. The new processors may also support parallel processing of single threads, for example, simultaneously processing four integer operations and two floating-point operations. Examples of such processors may include the Zen processors available from AMD, and the Core™ i3, i5, and i7 processors available from Intel®, among others.

It may be noted that the definition of less constrained and more constrained may depend on the application. For example, a wearable device may be considered a constrained device relative to a smart phone. Thus, the wearable device may offload some computing tasks to the smart phone, such as route calculations, estimated travel time, historical tracking of data, performance statistics, and the like. Further, the smart phone may be considered a constrained device for more complex calculations, such as graphics rendering, database searching, and the like. Thus, the smart phone may also offload tasks to other proximate devices that are less constrained by computing power and battery life.

FIG. 1 is a drawing of mobile device 102 offloading a computing task 104 to an edge device, such as an IoT device 106. The operating system 108 in the mobile device 102 may be enabled with a framework, as disclosed herein, termed offload computing protocol (OCP). The OCP may outsource 110 the computing task 104 from more constrained devices such as wearables, smart phones, tablets, and others, to proximate devices, such as the IoT device 106, that are less constrained relative to the offloading device. The IoT device 106 may execute the computing task 104 and return 112 the results 114 to the mobile device 102. The IoT device 106 may include a Java virtual machine (JVM) 116 to execute the computing task 104 outsourced 110 from the mobile device.

The use of OCP may enhance an IoT ecosystem by enabling a wide range of businesses and products, which may be developed to support this capability. OCP may use any network transport layer that is available, for example, on wearables, smartphones, and tablets, among others. The OCP may choose an available device and computational method that consumes the least power. For example, while the IoT device 106 may be able to provide computational power that lowers the loading on the mobile device 102, if a large data transfer is necessary for the computation, the loading on the battery reserve may make this impractical.

The application developers may explicitly define what code is to be offloaded using OCP or the application developers may develop general policies for allowing operating systems to transfer code when extra compute power is needed, such as based on battery reserve, computational capabilities, and available proximate devices. The operating system 108 in the sending and receiving device, such as the mobile device 102, may be enabled for OCP through the installation of OCP libraries or extensions to execute the tasks.

Figure 2:
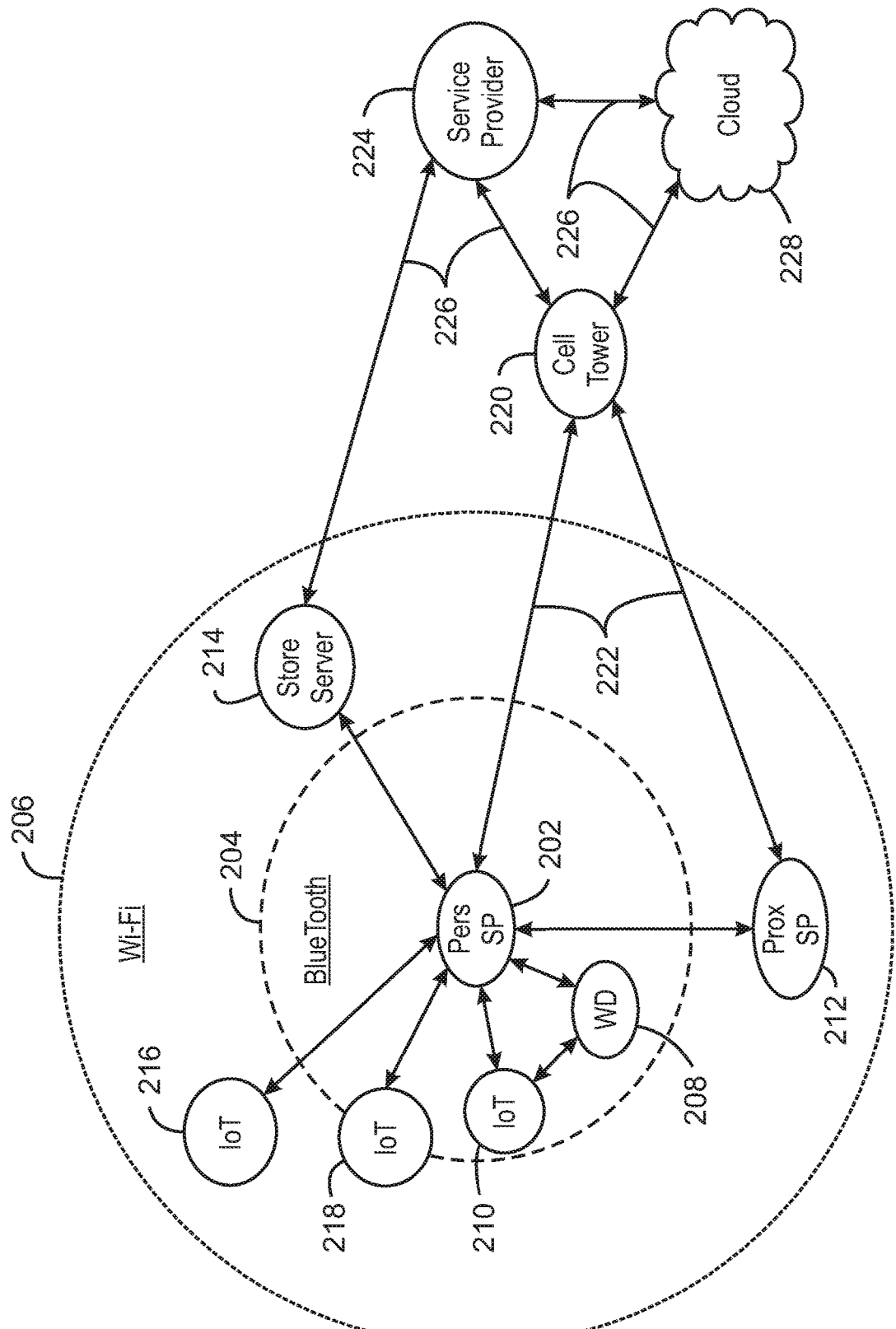
FIG. 2 is a drawing of a network ecosystem that places more constrained devices in communication with less constrained devices.

FIG. 2 is a drawing of a network ecosystem that places more constrained devices in communication with less constrained devices. It may be noted that this is not specific to IoT, but may take place in any type of network, including, for example, combinations of wired networks and wireless networks.

In this example, a personal smart phone 202 may include radio transceivers for both Bluetooth communication 204 and Wi-Fi communication 206. The range of the radio transceivers may differ, allowing Bluetooth communication 204 with proximate devices such as a wearable device 208 and the nearby IoT device 210. The wearable device 208 may include fitness monitors, smart watches, medical devices, and the like. The nearby IoT device 210 may include an advertising sign, a security system, an automated teller machine, an infrastructure device, such as a service robot, and the like.

The Wi-Fi communication 206 may allow the personal smart phone 202 to communicate with devices at a somewhat farther range, including, for example, proximate smart phones 212, such as carried by other users, servers, such as a store server 214, more distant IoT devices 216, and the like. Some devices may be at the border of the range of the Bluetooth communication 204, such as an intermediate IoT device 218 in this example. The choice of the radio frequency may then be made on the distance, efficiency, and reliability of the communication.

The personal smart phone 202 and proximate smart phone 212 may be in communication with a cell phone tower 220, through cellular links 222 that provide data and voice communications. The store server 214 and the cell tower 220 may be in communications with a service provider 224, for example, by optical or wired links 226. Similarly, the service provider 224 and the cell tower 220 may use optical or wired links 226 to couple with devices in the cloud 228. As used herein, the cloud 228 includes routers, switches, servers, and data centers, among other items. The cloud 228 may be part of the Internet.

The personal smart phone 202 may have limited computational or battery power for processing certain types of applications, such as image processing, video processing, and the like. If the personal smart phone 202 is equipped with an OCP enabled mobile operating system, as described with respect to FIG. 1, it may offload some of the computing load to nearby devices. The offloading may depend upon the computing capability of the nearby devices as well as the amount of power needed to transfer the data and code to the nearby devices. For example, the personal smart phone 202 may be able to use the computing capability in the nearby IoT device 210, transferring data and code over a Bluetooth communication 204.

If devices within the range of Bluetooth communication 204 are not sufficiently powerful, the personal smart phone 202 may identify more distant devices that are capable of handling the load. For example, the personal smart phone 202 may identify that the store server 214 is capable of handling the load, and that the personal smart phone 202 has sufficient battery life to provide reliable Wi-Fi communication 206 to the store server 214

Further, if a device capable of handling the workload is not a single hop away, a device that is a single hop away may pass the workload on to a more powerful device for processing. For example, if the route calculations to be performed by the wearable device 208 are too complex for the personal smart phone 202, the personal smart phone 202 may pass the calculation on to the store server 214, or an appropriate IoT device 210, 216, or 218. The personal smart phone 202 may the return the results to the wearable device 208 as if it had completed the computing workload.

Similarly, a user of the proximate smart phone 212 may have enabled the device to accept workloads from nearby devices. This may be done in exchange for later processing of offloading computing workloads by the user of the proximate smart phone 212, or in exchange for payment, such as through a bit coin or other blockchain transaction, and the like.

If the offloaded application from the personal smart phone 202, such as to the store server 214, uses data or other access to the cloud 228 the offloaded application may include credentials provided by the OCP allowing the offloading device to obtain the necessary access. For example, the store server 214 may provide the credentials for the network application to the service provider 224 for forwarding to the cloud 228, without having access to those credentials.

Other devices may be more constrained than the personal smart phone 202. For example, the wearable device 208 may be in communication with the personal smart phone 202 using the Bluetooth communication 204. Accordingly, the wearable device 208 may offload computing loads to the personal smart phone 202. The computing loads may include such things as route calculators and performance trackers for personal fitness monitors, data storage and uploading for heart and other health monitors, and dosage calculators for devices such as automated medicine administration devices, among others.

As described herein, OCP may use the fastest, or least expensive, or both, communications protocol available to maximize data communications while minimizing battery usage. For example, in a typical smart phone, such as the personal smart phone 202, the order of preference may be a hardware (wired) network connection, near field communications (NFC), Bluetooth, and Wi-Fi network communications. The order of preference may be due to performance drop-offs caused by data travelling greater distances to an offloading unit. Further, the OCP may minimize the number of hops the data has to take to an offloading processor.

Figure 3:
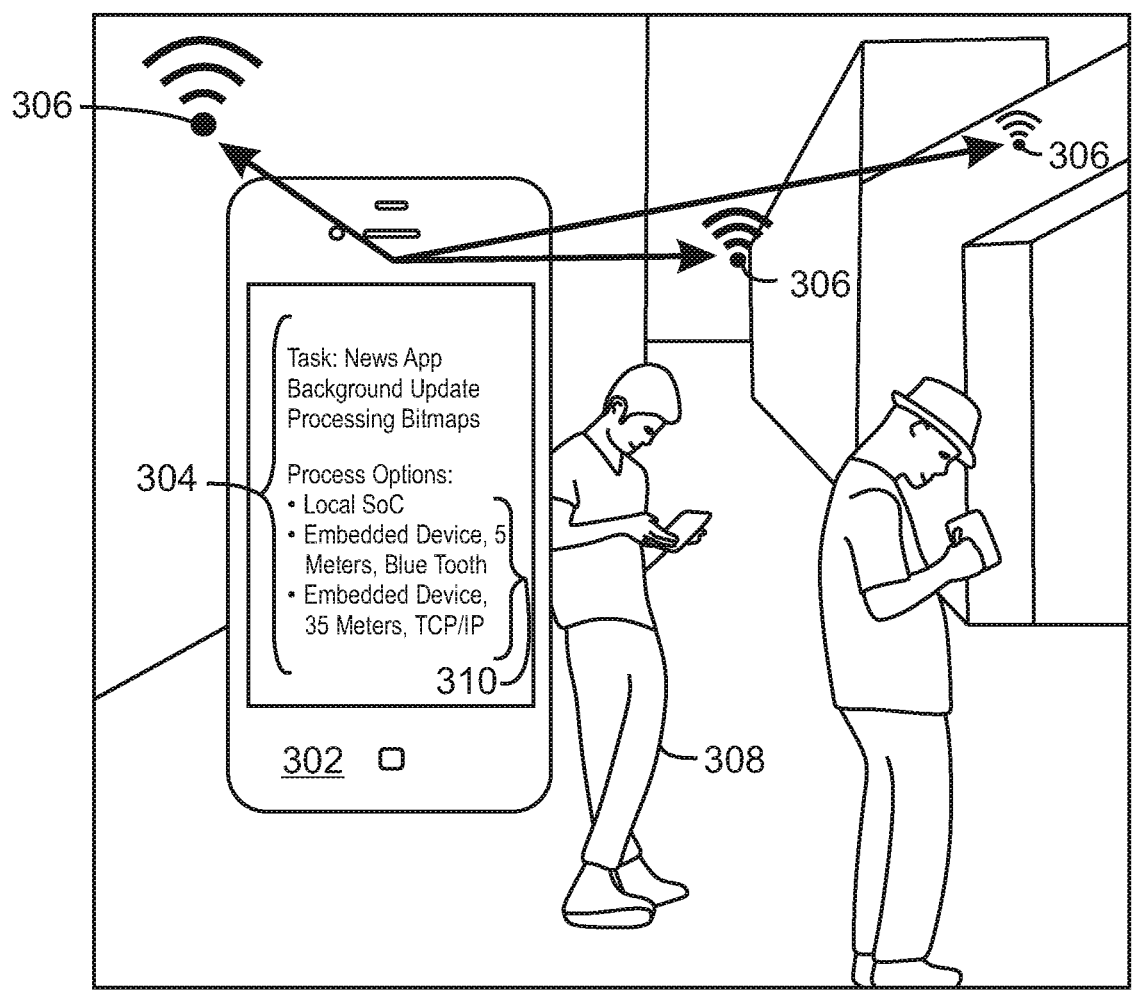
FIG. 3 is a drawing of a user device presenting selectable options for offloading a computing task to other devices determined to be within range.

FIG. 3 is a drawing of a user device 302 presenting options 304 for determining the location for processing a computing task, such as on the device or in other devices 306 determined to be within range of the user 308. The options 304 may identify to the particular app and activity that the user device 302 is attempting to perform. A menu 310 may be provided that identifies the distance and type of connection for the other devices 306. For example, the menu choices may include performing the calculation in the local system-on-a-chip (SoC), a device connected by a Bluetooth connection at 5 m, and a device connected by a Wi-Fi (TCP/IP) connection at 35 m. The user 308 may tap one of these choices to start the processing.

Depending on the remaining battery life in the user device 302, certain choices may not be displayed. For example, the user device 302 may be in communications with a Wi-Fi network, but not have sufficient battery life to maintain a long-term Wi-Fi connection. Accordingly, that choice may not be displayed.

Figure 4:
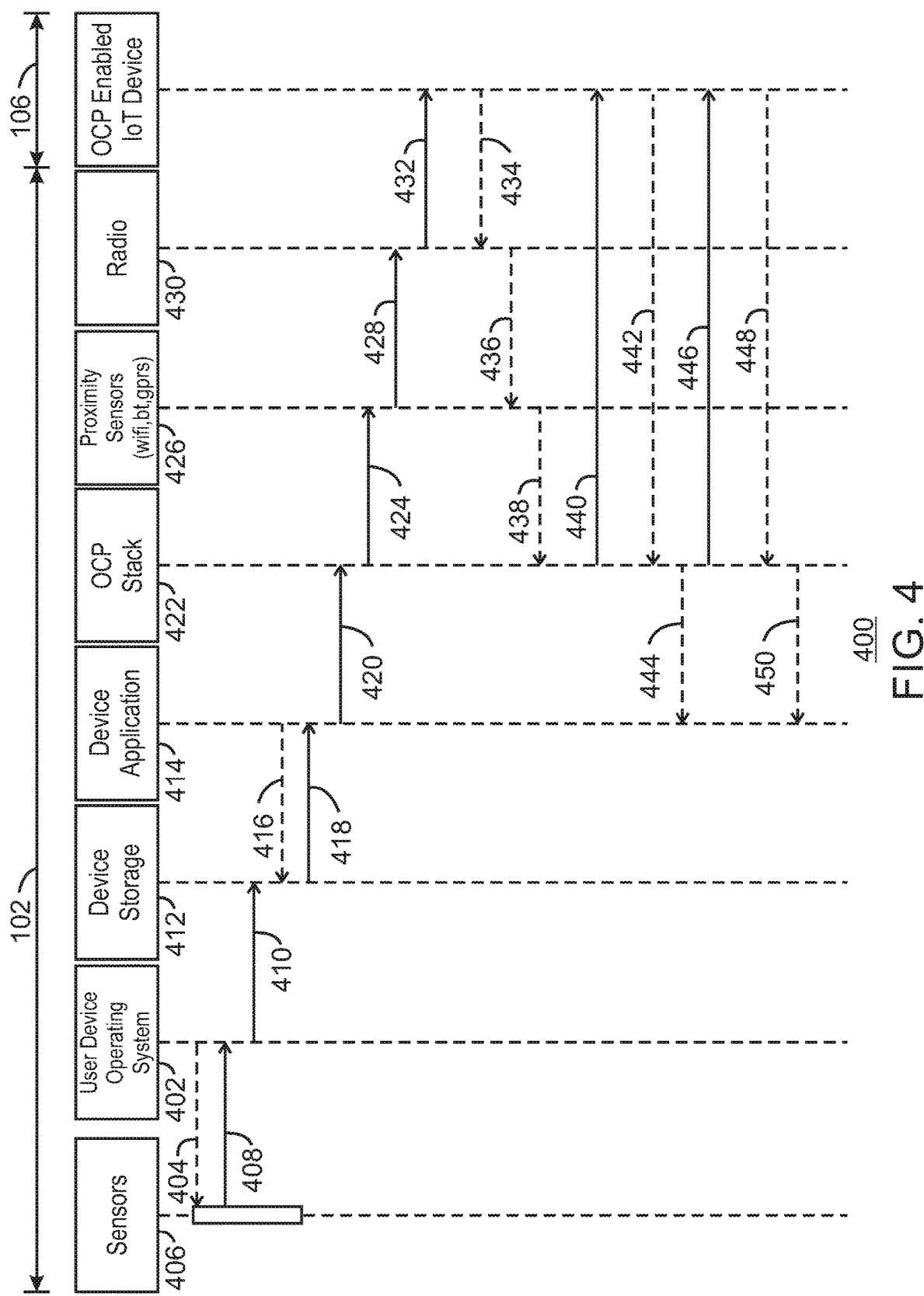
FIG. 4 is a ladder diagram of a method for offloading a computing task from a more constrained device, such as a mobile device, to a less constrained device, such as an IoT device.

FIG. 4 is a ladder diagram of a method 400 for offloading a computing task from a more constrained device, such as a mobile device 102, to a less constrained device, such as an IoT device 106. Like numbered items are as described with respect to FIG. 1. As described herein, OCP may offload a computing task to a nearby device, which executes the computing task and returns a result. The OCP may be exposed at the application layer so that developers can utilize it to improve the performance of their app when performing certain tasks.

The method 400 begins when a user device operating system (OS) 402 polls 404 sensors 406 for new data. The sensor data 408 is returned to the user device OS 402, which may then store 410 the sensor data 408 in a device storage 412. A device application 414 may then read 416 data 418 from the device storage 412.

The device application 414 may send an instruction 420 to an OCP stack 422 to find OCP capable devices. To perform this function, the OCP stack 422 may send an electronic leash request 424 to proximity sensors 426, which may detect Wi-Fi, Bluetooth, or general packet radio service (GPRS) signals, among others. The proximity sensors 426 may send an electronic leash message 428 to radio transceivers 430 to perform the detection function. An electronic leash request is a technique that allows a single device, such as the mobile device 102, to send request to large number of objects that are paired with the single device.

The radio transceivers 430 may send out a radio message 432 to determine if there are devices present in the vicinity of the mobile device 102. The radio message 432 may include queries to determine if an OCP enabled IoT device 106 is present. The OCP enabled IoT device 106 may send an acknowledgment 434 of its presence back to the radio transceivers 430. Multiple OCP enabled IoT devices may be located and enumerated by this technique. The radio transceivers 430 may then return a message 436 to the proximity sensors 426 indicating that OCP devices are present. Similarly, the proximity sensors 426 may then return a message 438 to the OCP stack 422 indicating that OCP devices are present.

The OCP stack 422 may identify the least expensive route to the OCP enabled IoT device 106. This may include selecting the OCP enabled IoT device 106 from the enabled devices that have been enumerated, and determining what radio frequency should be used to communicate with the OCP enabled IoT device 106. Although not shown, the communications between the OCP stack 422 and the OCP enabled IoT device 106 take place via the radio transceivers 430.

The OCP stack 422 may send a message 440 to the OCP enabled IoT device 106 to negotiate the offloading of computations. The OCP enabled IoT device 106 may then return an acknowledgment message 442 to inform the OCP stack 422 in the mobile device 102 that it can perform the offloaded computations.

The OCP stack 422 then obtains 444 the data and code from the device application 414. The data and code from the device application 414 are then sent to the OCP enabled IoT device 106 in a message 446. The OCP enabled IoT device 106 completes the computations, and returns a message 448 to the OCP stack 422 with the processed data. The OCP stack 422 may then send the process data 450 to the device application 414. Once used, the code sent to the OCP enabled IoT device 106 may be saved to accelerate future operations or it may be discarded, for example, if storage space is needed by the OCP enabled IoT device 106.

The overall execution of the OCP enable task may be summarized as four basic steps. The OCP stack 422 receives a task from a device application 414, and then parallelizes the task and analyzes execution hardware available in the local IoT environment, such as in the OCP enabled IoT device 106, or in other OCP devices in communication with the mobile device 102. The OCP stack 422 outsources the task to local SoCs, via best available communication technology, such as in the radio transceivers 430 a network interface controller (NIC), and the like. The OCP stack 422 receives data back though the radio transceivers 430 or NIC. If via TCP/IP, then through a static intermediary IP. The OCP stack 422 then provides the data back to the device application 414.

The OCP enabled IoT device 106 does not have to dedicate all processing power to the computing task offloaded from the mobile device. For example, the OCP enabled IoT device 106 may have a multicore processor capable of performing simultaneous multiple thread operations on each core. In this case the OCP enabled IoT device 106 may dedicate one core to performing task for the mobile device, such as two threads provided from the mobile device 102.

Figure 5:
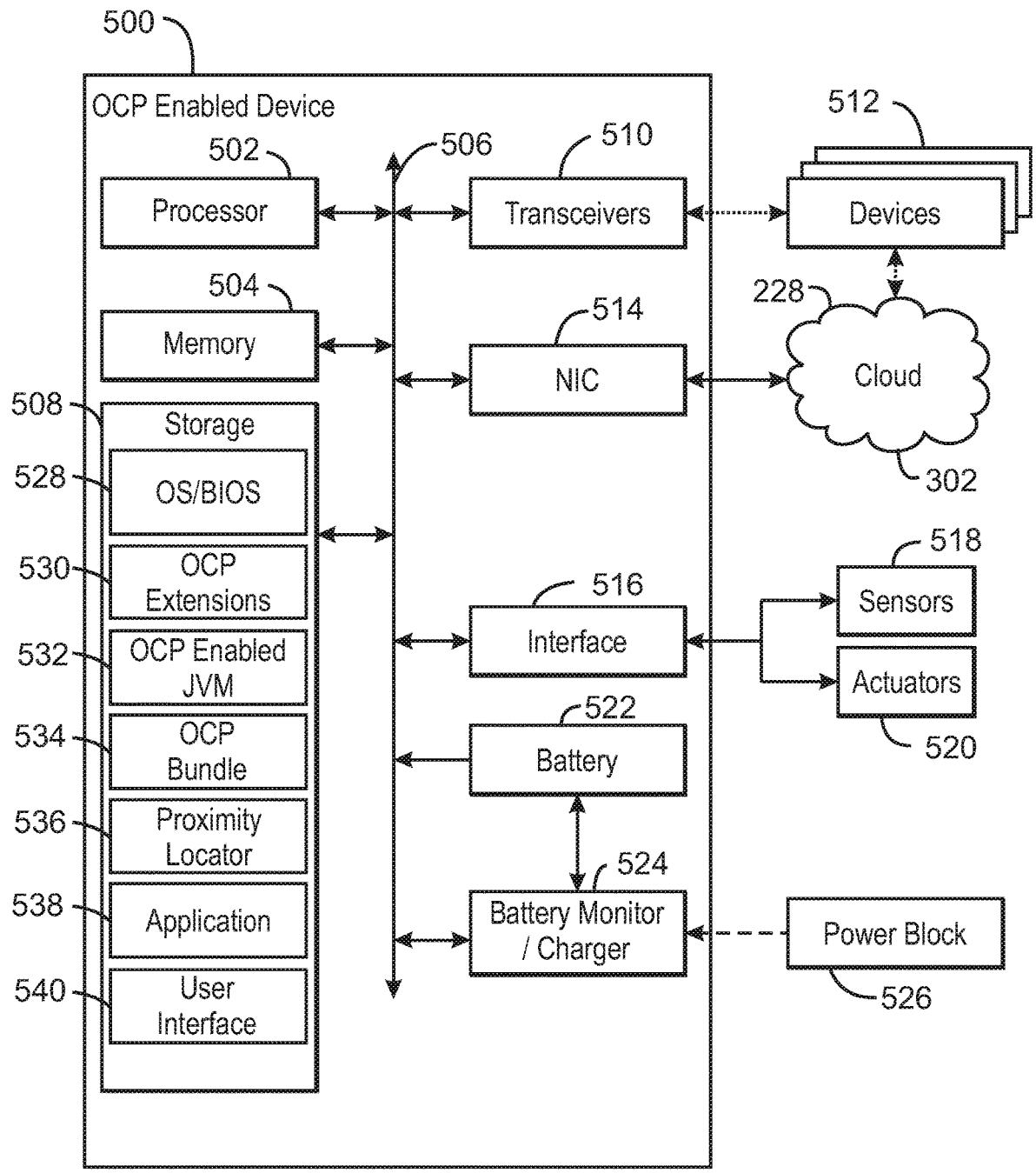
FIG. 5 is a block diagram of an example of components that may be present in a device for implementing the offloading of computing tasks.

FIG. 5 is a block diagram of an example of components that may be present in an OCP enabled device 500 for implementing the offloading of computing tasks. The OCP enabled device 500 may include any combinations of the components shown in the example. The components may be implemented as ICs, portions thereof, discrete electronic devices, or other modules, logic, hardware, software, firmware, or a combination thereof adapted in the OCP enabled device 500, or as components otherwise incorporated within a chassis of a larger system. The block diagram of FIG. 5 is intended to show a high level view of components of the OCP enabled device 500. However, some of the components shown may be omitted, additional components may be present, and different arrangement of the components shown may occur in other implementations.

The OCP enabled device 500 may include a processor 502, which may be a microprocessor, a multi-core processor, a multithreaded processor, an ultra-low voltage processor, an embedded processor, or other known processing element. The processor 502 may be a part of a system on a chip (SoC) in which the processor 502 and other components are formed into a single integrated circuit, or a single package, such as the Edison™ or Galileo™ SoC boards from Intel.

As an example, the processor 502 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as a processor in the Zen™ processor series available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 502 may communicate with a system memory 504 over a bus 506. Any number of memory devices may be used to provide for a given amount of system memory. As examples, the system memory 504 can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 508 may also couple to the processor 502 via the bus 506. To enable a thinner and lighter system design the mass storage 508 may be implemented via a solid state disk drive (SSDD). Other devices that may be used for the mass storage 508 include flash memory cards, such as SD cards, microSD cards, xD picture cards, and the like, and USB flash drives. In low power implementations, the mass storage 508 may be on-die memory or registers associated with the processor 502. However, in some examples, the mass storage 508 may be implemented using a micro hard disk drive (HDD). Further, any number of new technologies may be used for the mass storage 508 in addition to, or instead of, the technologies described, such resistance change memories, phase change memories, holographic memories, or chemical memories, among others. For example, the OCP enabled device 500 may incorporate the 3D XPOINT memories from Intel® and Micron®.

The components may communicate over the bus 506. The bus 506 may include any number of technologies, including industry standard architecture (ISA), extended ISA (EISA), peripheral component interconnect (PCI), peripheral component interconnect extended (PCIx), PCI express (PCIe), or any number of other technologies. The bus 506 may be a proprietary bus, for example, used in a SoC based system. Other bus systems may be included, such as an I²C interface, an SPI interface, point to point interfaces, and a power bus, among others.

The bus 506 may couple the processor 502 to radio transceivers 510, for communications with other devices 512. The other devices 512 may include any number of units that may participate in the offloading of computing loads, as described with respect to FIG. 2, such as IoT devices 210, 216, and 218, wearable devices 208, smart phones 202 and 212, a cell tower 220, and local servers, such as a store server 214, among others. Further, the radio transceivers 510 may provide direct or indirect communications, such as through service providers to devices in a cloud 228, among others. The radio transceivers 510 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the devices 512. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The radio transceivers 510 may communicate with devices 512 using multiple standards or radios for communications at different range. For example, the OCP enabled device 500 may communicate with close devices, e.g., within about 10 meters, using a local transceiver based on Bluetooth®, Bluetooth low energy (BLE), or another low power radio, to save power. More distant devices, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The radio transceivers 510 may be incorporated into an MCU as an address directly accessible by the chip, such as in the Curie® units available from Intel.

The radio transceivers 510 may include other types of radios to communicate with devices in the cloud 228. For example, the radio transceivers 510 may include an LPWA transceiver that follows the IEEE 802.15.4, or IEEE 802.15.4g standards, among others. The LPWA transceiver may communicate over a wide area using LoRaWAN™ (Long Range Wide Area Network) developed by Semtech and the LoRa Alliance. The techniques described herein are not limited to these technologies, but may be used with any number of other transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the radio transceivers 510, as described herein. For example, the radio transceivers 510 may include an LTE or other cellular transceiver that uses spread spectrum (SPA/SAS) communications for implementing high speed communications, such as for video transfers. Further, any number of other protocols may be used, such as Wi-Fi® networks for medium speed communications, such as still pictures, sensor readings, and provision of network communications.

The radio transceivers 510 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11 ay, and the like. In addition to the standards listed above, any number of satellite uplink technologies may be included in the radio transceivers 510, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 514 may be included to provide a wired communication to the cloud 228 or to other devices 512. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC may be included to allow connect to a second network, for example, the OCP enable device 500 may include a NIC 514 providing communications to the cloud 228 over Ethernet, and a second NIC providing communications to other devices over another type of network.

The bus 506 may couple the processor 502 to an interface 516 that is used to connect external devices. The external devices may include sensors 518, such as accelerometers, level sensors, flow sensors, temperature sensors, pressure sensors, barometric pressure sensors, and the like. The interface 516 may be used to connect the OCP enabled device 500 to actuators 520, such as power switches, valve actuators, an audible sound generator, a visual warning device, and the like.

While not shown, various input/output (I/O) devices may be present within, or connected to, the OCP enabled device 500. For example, a display may be included to show information, such as OCP menus and calculation results, among others. An input device, such as a touch screen or keypad may be included to accept input.

A battery 522 may power the OCP enabled device 500, although in examples in which the OCP enabled device 500 is mounted in a fixed location, it may have a power supply coupled to an electrical grid. The battery 522 may be a lithium ion battery, a metal-air battery, such as a zinc-air battery, an aluminum-air battery, a lithium-air battery, and the like. Further, the battery 522 may be a hybrid battery system, including a chemical based, rechargeable battery, such as a lithium ion battery, and a super capacitor.

A battery monitor/charger 524 may be included in the OCP enabled device 500 to track the state of charge (SoCh) of the battery 522. The battery monitor/charger 524 may be used to monitor other parameters of the battery 522 to provide failure predictions, such as the state of health (SoH) and the state of function (SoF) of the battery 522. The battery monitor/charger 524 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 524 may communicate the information on the battery 522 to the processor 502 over the bus 506. The battery monitor/charger 524 may also include an analog-to-digital (ADC) convertor that allows the processor 502 to directly monitor the voltage of the battery 522 or the current flow from the battery 522. The battery parameters may be used to determine actions that the OCP enabled device 500 may perform, such as selecting routes to a device 512 for offloading of computing loads, determining if the OCP enabled device 500 has sufficient power to offload computing loads, and the like.

A power block 526, or other power supply coupled to a grid, may be coupled with the battery monitor/charger 524 to charge the battery 522. In some examples, the power block 526 may be replaced, or supplemented with, a wireless power receiver to obtain the power wirelessly, for example, through a loop antenna in the OCP enabled device 500. A wireless battery charging circuit, such as an LTC4020 chip from Linear Technologies of Milpitas, Calif., among others, may be included in the battery monitor/charger 524. The specific charging circuits chosen depend on the size of the battery 522, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The mass storage 508 may include a number of modules to implement the group creation functions described herein. Although shown as code blocks in the mass storage 508, it may be understood that any of the modules may be replaced with hardwired circuits, for example, built into an application specific integrated circuit (ASIC). The mass storage 508 may include an operating system/basic input-output system (OS/BIOS) 528 that has been modified to enable the use of offload computing protocol (OCP). The OCP may be provided by OCP extensions 530, such as an OCP library. The OCP extensions 530 may control an OCP stack, as described with respect to FIG. 4. The application developer may explicitly define what code is to be executed using the OCP extensions 530.

As the OCP enabled device 500 may perform as both a client of other devices for the offloading of computing loads and the server to other devices for performing offloaded computing loads, it may also include an OCP enabled Java virtual machine (JVM) 532. A computing load offloaded from another device 512 may be executed on the OCP enabled device 500 by the OCP enabled JVM 532. This may isolate the computing workload from the remote device 512 from the OS/BIOS 528 in the OCP enabled device 500, protecting both devices from security faults.

The code in the OCP extensions 530 in an offloading OCP enabled device 500 may create an OCP bundle 534, which includes the information required by the processing device to execute the task. The information may include a return IP address, to which the IP task results should be sent. The code for performing the offload task, such as the Java code to be executed on the JVM in the receiving OCP enabled device 500. The data to be used by the code, for example, in JASON or XML format. The OCP bundle 534 may also include the return type for the expected return value, such as Int, string, Boolean, and the like. To perform these functions, the OCP extensions 530 may be imported and invoked for the language and OS/BIOS 528 used in the OCP enabled device 500.

A stand-alone class that undertakes the specific task utilizing OCP may be created. The stand-alone class includes methods and structure for the OCP bundle 534 to execute it on and OCP enabled device 500. The OCP bundle 534 may be compiled into machine readable files and run by the OCP enabled JVM 532 on the receiving device. An example of the creation of an OCP bundle 534 for the Android operating system used by many smart phones is shown below:

```
import android.OCP;
public class CalcYearToDateRainfallStats_OCP extends OCP
{
  @Override
  public OCPBundle onCreateOcpBundle( )
  {
```

```
/*OCPBundle requires 4 elements
  * 1) ReturnIp - the IP task result should be sent to
  * 2) Instructions - the java code to be executed on a jvm
  * 3) Data - the data to be used by the code in standard JSON
    or XML format
  * 4) Return type - the expected return value type; eg int, string,
    boolean etc.
*/
String instructions = "for (int i=0; i< marks.size( ); i++){sum += i;)
return sum / marks.size( );";
OCPBundle = new OCPBundle( );
OCPBundle.addData(largeRainfallDataArray);
OCPBundle.addInstructions(instructions);
OCPBundle.addReturnIP("10.20.30.40");
OCPBundle.addReturnType(Integer);
OCPBundle.execute( );
  }
}
```

The OCP enabled device 500 may include a number of other blocks to complete the functionality. A proximity locator 536 may access the radio transceivers 510 to locate OCP enabled devices in the vicinity. An application 538 may perform the basic function requested by the user. The application 538 may also trigger the OS/BIOS 528 to use the OCP extensions 530 to offload a computing load to a proximate device 512. A user interface 540 may be provided to allow inputs, such as a menu allowing a choice of devices for the offloading of computing loads, and to display the results from the application.

Figure 6:
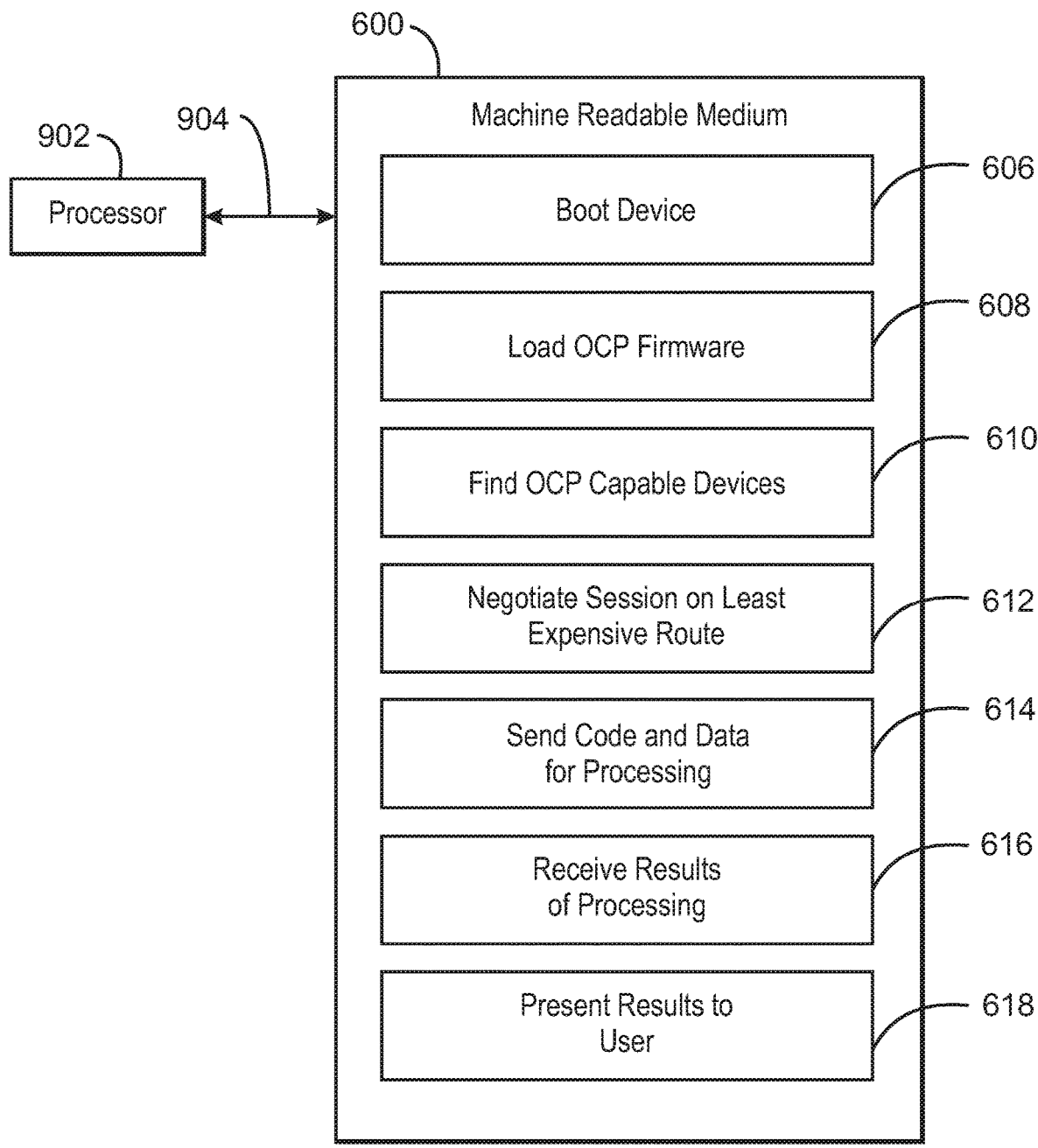
FIG. 6 is a block diagram of a non-transitory, machine readable medium including code to direct a processor to participate in the offloading of computing tasks.

FIG. 6 is a block diagram of a non-transitory, machine readable medium including code to direct a processor to participate in the offloading of computing tasks. The processor 602 may access the non-transitory, machine readable medium 600 over a bus 604. The processor 602 and bus 604 may be selected as described with respect to the processor 502 and bus 506 of FIG. 5. The non-transitory, machine readable medium 600 may include devices described for the mass storage 508 of FIG. 5 or may include optical disks, thumb drives, or any number of other hardware devices.

The non-transitory, machine readable medium 600 may include code 606 to direct the processor 602 to boot a device, which may include the use of measurements by a trusted platform module to establish a trusted execute environment. Code 608 may be included to direct the processor 602 to load OCP firmware, such as a library to support the OCP functions. Code 610 may be included to direct the processor 602 to find OCP capable devices for the offloading of computations.

Code 612 may be included to direct the processor 602 to negotiate a session on the least expensive computing device and route. The session may include the remote device performing a computational task for local device, for example, using code and data transferred from the local device. Code 614 may be included to direct the processor 602 to send the code and data to the remote device for processing. Code 616 may be included to direct the processor 602 to receive the results of the processing from the remote device. Code 618 may be included to direct the processor 602 to present the results of the calculation to the user.

EXAMPLES

Example 1 provides an apparatus including an offload computing protocol (OCP) enabled device. The OCP enabled device includes OCP extensions to an operating system to enable offloading of a computing task, a proximity locator to use a radio transceiver to locate an OCP device to accept the computing task, and an OCP bundle comprising code and data. The OCP bundle is to be sent to the OCP device.

Example 2 includes the subject matter of example 1. In example 2, the apparatus includes an OCP enabled Java virtual machine (JVM) to process a second computing task sent by another device.

Example 3 includes the subject matter of either of examples 1 or 2. In example 3, the apparatus includes a plurality of radio transceivers to locate the OCP device, wherein the radio transceiver used to communicate with the OCP device is selected based, at least in part, on a cost of a communication.

Example 4 includes the subject matter of any of examples 1 to 3. In example 4, a cost of a communication is based on, at least in part, an amount of power used to provide the communication in comparison to an amount of a battery reserve left in the OCP enabled device.

Example 5 includes the subject matter of any of examples 1 to 4. In example 5, the apparatus includes an operating system/basic input-output system to call the OCP extensions.

Example 6 includes the subject matter of any of examples 1 to 5. In example 6, the apparatus includes an application that comprises the computing task.

Example 7 includes the subject matter of any of examples 1 to 6. In example 7, the apparatus includes a user interface to present OCP choices, calculation results, or control screens, or any combinations thereof.

Example 8 includes the subject matter of any of examples 1 to 7. In example 8, the apparatus includes an OCP stack, comprising a protocol stack that comprises OCP functionality.

Example 9 includes the subject matter of any of examples 1 to 8. In example 9, the apparatus includes a processor that performs six micro operations simultaneously, comprising four integer operations and two floating-point operations.

Example 10 includes the subject matter of any of examples 1 to 9. In example 10, the apparatus includes a processor that comprises a two core, four thread symmetric multithreading building block.

Example 11 includes the subject matter of any of examples 1 to 10. In example 11, the apparatus includes a processor that comprises a four core, eight thread symmetric multithreading building block.

Example 12 includes the subject matter of any of examples 1 to 11. In example 12, the apparatus includes a processor that comprises an eight core, sixteen thread symmetric multithreading building block.

Example 13 includes the subject matter of any of examples 1 to 12. In example 13, the OCP enabled device comprises a smart phone.

Example 14 includes the subject matter of any of examples 1 to 13. In example 14, the OCP enabled device comprises a wearable device.

Example 15 includes the subject matter of any of examples 1 to 14. In example 15, the OCP enabled device comprises an Internet-of-things (IoT) device.

Example 16 provides a method for offloading a computing task. The method includes locating an offload computing protocol (OCP) capable device, determining a route to the OCP capable device, and negotiating a session on the OCP capable device. Code and data are sent to the OCP capable device for processing and a result is received back from the OCP capable device.

Example 17 includes the subject matter of example 16. In example 17, locating an OCP capable device comprises sending an electronic leash request to a plurality of communicatively coupled devices to determine which are capable of OCP operations.

Example 18 includes the subject matter of either of examples 16 or 17. In example 18, determining the route comprises identifying the OCP capable device that is capable of processing the offloaded computing task and has a low energy consumption for communication with the OCP capable device.

Example 19 includes the subject matter of any of examples 16 to 18. In example 19, the route for communication comprises Bluetooth.

Example 20 includes the subject matter of any of examples 16 to 19. In example 20, the method includes where the route for communication comprises Wi-Fi.

Example 21 includes the subject matter of any of examples 16 to 20. In example 21, negotiating the session comprises receiving an acknowledgment from the OCP capable device.

Example 22 includes the subject matter of any of examples 16 to 21. In example 22, sending the code and data comprises creating an OCP bundle, and sending the OCP bundle to the OCP capable device. The OCP bundle comprises a return IP address for the result, the code, the data, and a return type for the result.

Example 23 includes the subject matter of any of examples 16 to 22. In example 23, the method includes providing a menu to user to allow the user to select the OCP capable device from a plurality of OCP capable devices.

Example 24 includes the subject matter of any of examples 16 to 23. In example 24, the method includes allowing a selection to prevent the code and data from being sent out to the OCP capable device.

Example 25 includes the subject matter of any of examples 16 to 24. In example 25, the method includes comprising: polling a sensor for values; and saving the values to a device storage as the data.

Example 26 includes the subject matter of any of examples 16 to 25. In example 26, the method includes performing an offloaded computing task on a single core in a multicore processor.

Example 27 includes the subject matter of any of examples 16 to 26. In example 27, the offloaded computing task comprises two threads running on the single core.

Example 28 provides a non-transitory, machine-readable medium including instructions to direct a processor to perform any one of the methods of claims 16 to 27.

Example 29 provides an apparatus including means to perform any one of the methods of claims 16 to 27.

Example 30 provides a non-transitory, machine readable medium, including instructions that, when executed, direct a processor to find an offload computing protocol (OCP) capable device and negotiate a session on a low cost route to the OCP capable device. Instructions are included that, when executed, direct the processor to send code and data to the OCP capable device.

Example 31 includes the subject matter of example 30. In example 31, the non-transitory, machine readable medium includes instructions that, when executed, direct the processor to receive a result from the OCP capable device, and present the result to user.

Example 32 includes the subject matter of either of examples 30 or 31. In example 32, the non-transitory, machine readable medium includes instructions that, when executed, direct the processor to boot a device, and load OCP firmware.

Example 33 includes the subject matter of any of examples 30 to 32. In example 33, the non-transitory, machine readable medium includes instructions that, when executed, direct the processor to create an OCP bundle, and send the OCP bundle to the OCP capable device.

Example 34 includes the subject matter of any of examples 30 to 33. In example 34, the non-transitory, machine readable medium includes instructions that, when executed, direct the processor to accept an OCP bundle from a device, use the code in the OCP bundle to process data in the OCP bundle, and return a result to the device.

Example 35 includes the subject matter of any of examples 30 to 34. In example 34, the non-transitory, machine readable medium includes instructions that, when executed, direct the processor to send out radio signals to determine if there are devices present in a vicinity, and query any devices present in the vicinity to determine if the devices are OCP capable.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus comprising an offload computing protocol (OCP) enabled device comprising:
   OCP extensions to an operating system to enable offloading of a computing task;
   a proximity sensor to detect radio signals;
   a proximity locator to send a request through a radio transceiver to locate a plurality of OCP devices capable of handling the computing task within a predetermined vicinity around the apparatus;
   a user interface to present OCP choices, calculation results, control screens, or any combinations thereof, to a user to select an OCP device from the plurality of OCP devices; and
   an OCP bundle comprising code and data, wherein the OCP bundle is to be sent to the selected OCP device;
   wherein a radio transceiver used to communicate with the OCP device is selected based on, at least in part, an amount of power to be used to communicate with the OCP device and an amount of power used to provide the communication in comparison to an amount of a battery reserve left in the selected OCP device.

2. The apparatus of claim 1, comprising an OCP enabled Java virtual machine (JVM) to process a second computing task sent by another device.

3. The apparatus of claim 1, comprising a plurality of radio transceivers to locate the plurality of OCP devices, wherein the radio transceiver used to communicate with the selected OCP device is selected based, at least in part, on a cost of a communication.

4. The apparatus of claim 1, comprising an operating system/basic input-output system to call the OCP extensions.

5. The apparatus of claim 1, comprising an OCP stack, comprising a protocol stack that comprises OCP functionality.

6. The apparatus of claim 1, comprising a processor that performs six micro operations simultaneously, comprising four integer operations and two floating-point operations.

7. The apparatus of claim 1, comprising a processor that comprises a two core, four thread symmetric multithreading building block.

8. The apparatus of claim 1, comprising a processor that comprises a four core, eight thread symmetric multithreading building block.

9. The apparatus of claim 1, comprising a processor that comprises an eight core, sixteen thread symmetric multithreading building block.

10. A method for offloading a computing task from an apparatus, comprising:

locating a plurality of offload computing protocol (OCP) capable devices using a proximity sensor to detect radio signals, and a proximity locator to send a request through a radio transceiver to locate the plurality of OCP capable devices in a predetermined vicinity;

providing a menu to user to allow the user to select an OCP capable device from the plurality of OCP capable devices;

determining a route to the selected OCP capable device;

negotiating a session on the selected OCP capable device;

sending code and data to the selected OCP capable device for processing;

receiving a result back from the selected OCP capable device; and selecting a radio transceiver used to communicate with the selected OCP device based on, at least in part, an amount of power to be used to communicate with the selected OCP device and an amount of power used to provide the communication in comparison to an amount of a battery reserve left in the selected OCP device.

11. The method of claim 10, wherein locating an OCP capable device comprises sending an electronic leash request to a plurality of communicatively coupled devices to determine which are capable of OCP operations.

12. The method of claim 10, wherein determining the route comprises identifying the selected OCP capable device that is capable of processing the offloaded computing task and has a low energy consumption for communication with the apparatus.

13. The method of claim 12, wherein the route for communication comprises Bluetooth.

14. method of claim 12, where the route for communication comprises Wi-Fi.

15. The method of claim 10, wherein sending the code and data comprises:
creating an OCP bundle, wherein the OCP bundle comprises:
a return IP address for the result;
the code;
the data; and
a return type for the result; and
sending the OCP bundle to the selected OCP capable device.

16. The method of claim 10, comprising performing an offloaded computing task on a single core in a multicore processor.

17. The method of claim 16, wherein the offloaded computing task comprises two threads running on the single core.

18. A non-transitory, machine readable medium, comprising instructions that, when executed by a machine, direct a processor coupled to the machine to:
find a plurality of offload computing protocol (OCP) capable devices using a proximity sensor to detect radio signals, and a proximity locator to send a request through a radio transceiver to locate the plurality of OCP capable devices in a predetermined vicinity;
provide a menu to a user to allow the user to select an OCP capable device from the plurality of OCP capable devices;
negotiate a session on a low cost route to the selected OCP capable device;
send code and data to the selected OCP capable device; and
select a radio transceiver used to communicate with the selected OCP device based on, at least in part, an amount of power to be used to communicate with the selected OCP device and an amount of power used to provide the communication in comparison to an amount of a battery reserve left in the selected OCP device.

19. The non-transitory, machine readable medium of claim 18, comprising instructions that, when executed, direct the processor to:
receive a result from the selected OCP capable device; and
present the result to user.

20. The non-transitory, machine readable medium of claim 18, comprising instructions that, when executed, direct the processor to:
create an OCP bundle; and
send the OCP bundle to the selected OCP capable device.

21. The non-transitory, machine readable medium of claim 18, comprising instructions that, when executed, direct the processor to:
accept an OCP bundle from a device;
use the code in the OCP bundle to process data in the OCP bundle; and
returning a result to the device.

22. The non-transitory, machine readable medium of claim 18, comprising instructions that, when executed, direct the processor to:
send out radio signals to determine if there are devices present in a vicinity; and
query any devices present in the vicinity to determine if the devices are OCP capable.

* * * * *

UNITED STATES PATENT AND TRADEMARK OFFICE
CERTIFICATE OF CORRECTION

PATENT NO. : 11,204,808 B2  
APPLICATION NO. : 15/375940  
DATED : December 21, 2021  
INVENTOR(S) : O'Hare et al.

Page 1 of 1

It is certified that error appears in the above-identified patent and that said Letters Patent is hereby corrected as shown below:

On the Title Page

Item (57), in "Abstract", in Column 2, Line 1, after "methods", delete "for"

In the Claims

In Column 17, Line 33, in Claim 14, before "method", insert --The--

Signed and Sealed this  
Eighth Day of March, 2022

Drew Hirshfeld  
*Performing the Functions and Duties of the  
Under Secretary of Commerce for Intellectual Property and  
Director of the United States Patent and Trademark Office*